United States Patent [19]

Rabenau et al.

[11] 4,234,554

[45] Nov. 18, 1980

[54] STABLE CRYSTALLINE LITHIUM NITRIDE AND PROCESS FOR ITS PREPARATION

[75] Inventors: Albrecht Rabenau; Ulrich von Alpen, both of Stuttgart; Erich Schönherr, Leonberg; Gertraude Müller, Leonberg-Ramtel, all of Fed. Rep. of Germany

[73] Assignee: Max-Planck-Gesellschaft zur forderung der Wissenschaften e.V., Göttigen, Fed. Rep. of Germany

[21] Appl. No.: 929,143

[22] Filed: Jul. 28, 1978

[30] Foreign Application Priority Data

Nov. 11, 1977 [DE] Fed. Rep. of Germany ....... 2750607

[51] Int. Cl.$^3$ .............................................. C01B 21/06
[52] U.S. Cl. .................................. 423/409; 23/302 R; 156/600; 156/617 SP; 156/624; 204/195 S; 350/357; 429/33; 429/46; 429/191
[58] Field of Search ..................... 423/406, 409; 75/66; 23/302 R; 156/600, 617 SP, 624; 204/195 S; 429/33, 46, 191; 350/357

[56] References Cited

U.S. PATENT DOCUMENTS 2,910,347  10/1959  Esmay .................................. 423/409

OTHER PUBLICATIONS

Fatt, et al., "Alkali Metal Dispersing" D. Van Nostrand Co., Inc., New York, New York, 1962, p. 6.

*Primary Examiner*—Earl C. Thomas
*Attorney, Agent, or Firm*—Sprung, Felfe, Horn, Lynch & Kramer

[57] ABSTRACT

Crystalline lithium nitride, stable in air, characterized by a sodium content of less than $5 \times 10^{-2}$ weight-percent, a potassium content of less than $10^{-2}$ weight-percent, a magnesium content of less than $1 \times 10^{-2}$ weight-percent, and a silicon and iron content of $10^{-2}$ to $10^{-3}$ weight-percent each; is obtained by heating lithium having a purity of at least 99.9% in a vessel made of tungsten, niobium, ruthenium or tantalum in a nitrogen atmosphere at a pressure of at least 250 mm Hg in the absence of oxygen and water at a temperature of from 300° C. to the melting point of lithium nitride.

5 Claims, No Drawings

STABLE CRYSTALLINE LITHIUM NITRIDE AND PROCESS FOR ITS PREPARATION

The invention relates to an air-stable crystalline lithium nitride and a method of preparing it. In addition, the invention relates to the use of said lithium nitride as an ionic conductor.

Due to its highly electropositive character and its low equivalent weight, lithium in the form of its compounds is of special interest for solid, ionically conducting electrolytes. A solid ionic conductor for $Li^+$ ions should fulfill the following three requirements in the temperature range from room temperature to about 250° C.:

1. It must have a high $Li^+$ ionic conductivity combined with negligible electronic conductivity,
2. The ionic conductor must be thermodynamically stable with elemental lithium,
3. It must have a high decomposition voltage.

Such a material has hitherto not been known. For example, primary batteries on the basis of lithium electrolytes are known. Such a battery consists of a system of lithium, lithium iodide and iodine. One disadvantage of the lithium electrolyte LiI is its high ohmic resistance. The resistance of lithium iodide at room temperature is of the order of $10^6$ ohms per centimeter. On the basis of this low conductivity, the battery can be constructed only with very thin electrolyte layers.

Another lithium of superior conductivity at room temperature in comparison with lithium iodide is lithium betaaluminum oxide. This compound, however, is unstable and is not in equilibrium, especially with lithium itself, and in battery use, one of the electrodes is lithium. Its practical usefulness is therefore very limited.

Good liquid electrolytes are known which contain lithium as ionic conductor. Their practical application, however, is nullified by the fact that after a certain time of operation, explosive decomposition often occurs, the cause of which is unknown.

Another known lithium compound is lithium nitride ($Li_3N$), which is a solid that has such a high ionic conductivity even at room temperature that it could be used for the construction of good microbatteries. Work has therefore already been done (at great expense) in the development of such lithium nitride batteries, but with no success thus far. The failure of the experiments has been due to the instability of lithium nitride, especially in contact with air and moisture. Lithium nitride has a free enthalpy of formation of 30.8 kcal per mole, which corresponds to a decomposition voltage of 0.44 volt. It is therefore a system of poor thermodynamic stability and decomposition would be expected to ensue upon the application of a voltage of no more than about 0.4 volt.

It has now surprisingly been found that a stable form of lithium nitride can be created which fulfills simultaneously all three of the above-stated requirements.

In accordance with the invention, therefore, an airstable, crystalline lithium nitride is provided which is characterized by the fact that it has a sodium content of less than $5\times 10^{-2}$ wt%, a potassium content of less than $10^{-2}$ wt%, a calcium content of less than $10^{-3}$ wt%, a magnesium content below $1\times 10^{-2}$ wt%, and a silicon and iron content of $10^{-2}$ wt% to $10^{-3}$ wt% each. The inventive lithium nitride is obtained by heating metallic lithium of at least 99.9% purity in a vessel of tungsten, niobium, ruthenium or tantalum in a nitrogen atmosphere at a pressure of at least 250 nm of mercury, under the exclusion of oxygen and (even traces of) water, and heat treatment carried out at a temperature between 300° C. and the melting point of lithium nitride.

Surprisingly, a homogeneous crystalline lithium nitride which complies with all of the above-stated high purity requirements, has great stability. It is assumed that the tendency to decomposition, which was to be expected and has repeatedly been confirmed in the literature, is kinetically inhibited and thus the practical use of this material becomes possible.

The crystalline lithium nitride of the invention is in the form of hexagonal crystals which have a layered structure containing $Li_2N$ layers between which lithium ions are situated. Parallel with the $Li_2N$ planes there is a high lithium ion conductivity of the order of $\sigma=10^{-3}\Omega^{-1}cm^{-1}$ having an activation energy of 0.25 eV.

For the achievement of the above-stated high purity, not only very pure reagents (metallic lithium and nitrogen) must be used, but also special attention must be given to the material of the apparatus used for this purpose. Lithium nitride is an extremely reactive and aggressive substance capable of greatly corroding virtually all materials, and therefore it absorbs impurities. These impurities appear to be an important cause of the known instability of lithium nitride. This is not in harmony with the views put forth in the past. For example, in J. Chem. Thermodynamics, 1975, 7, 13 to 20, it is stated that it is difficult to prepare and maintain $Li_3N$ in highly pure form, since it reacts very easily with air and moisture and is easily oxidized.

During the preparation process, lithium nitride dissolves, for example, quartz and aluminum oxide. Only niobium and ruthenium have proven to be resistant to it, and so has tantalum to a lesser extent. Surprisingly, however, tungsten has proven to have especially good characteristics as a material, even though it is slightly attacked by lithium nitride. In this case, however, all that forms is a coating containing tungsten, lithium and nitrogen, which can be removed mechanically after production. No tungsten can be detected by spectrum analysis in the crystals thus produced.

Especially preferred is a lithium nitride which contains sodium in an amount of not more than $8\times 10^{-3}$ wt-% and potassium not exceeding $3\times 10^{-3}$ wt-%, calcium less than $7\times 10^{-3}$ wt-% (determined by atomic absorption analsysis), and magnesium, copper and nickel in an amount not exceeding $5\times 10^{-4}$ wt-% each, aluminum not exceeding $5\times 10^{-3}$ wt-% and silicon and iron in the above-stated range, as determined by spectral analysis.

In comparison, commercial lithium metal which is not suitable in the scope of the invention, and which has been used heretofore for the production of lithium nitride, has a content of about 1% Na, 0.01% K, 0.05% Ca, 0.008% Fe and 0.005% Pb in addition to other impurities. It is especially important that the content of sodium, potassium and calcium not exceed substantially the above-stated maximums. For it has been found that, at the temperatures commonly used hitherto for the production of lithium nitride, which are around 150° to 180° C., a product of the desired stability is not obtained even when the above-stated purity and material requirements are met. Instead, it is important that the above-described high-temperature treatment be applied. At the same time it is possible to apply this heat treatment to lithium nitride prepared at lower temperature with the maintenance of the other stated conditions, as well as to undertake the preparation at the above-stated high temperatures.

The method of the invention for the preparation of the above-described, air-stable, crystalline lithium nitride consists in reacting at least 99.9% pure lithium metal with pure nitrogen at a pressure of at least 200 mmHg by heating, and melting the reaction product under at least 250 mmHg of nitrogen pressure, and then directionally or slowly solidifying the melt or by reacting the lithium slowly with pure nitrogen gas or nitrogen diluted with inert gas, at low pressure, at a temperature maintained above 300° C.

In addition to the purity of the reagents used, the material of the crucible and the complete exclusion of oxygen and moisture, it is of especial importance in the process of the invention to use a temperature greater than 300° C.

Lithium nitride obtained by the method of the invention can be obtained in polycrystalline form or as a monocrystal. This will depend essentially on the duration of the heat treatment and can be controlled by the methods of the crystal growing art. If the criteria of the method of the invention are observed, a lithium nitride that can be handled in air without special precautions will be obtained, which is so stable that it can be subjected even to the conventional processes of ceramic production, that is, for example, it can be pressed and sintered in polycrystalline form. For example, the ground lithium nitride powder can be compressed in molds under high pressure of, for example, 1 to 3 Kbar, at temperatures ranging from 600° to 750° C. in a nitrogen atmosphere, and sintered. Such compacts can be used even for secondary batteries, i.e., rechargeable batteries, for example in the form of a U-shaped ceramic which is filled with sulfur and immersed in lithium, or vice versa.

The removal of surface impurities from the pure lithium used for the synthesis is performed in a "dry box". Such devices are known. They consist basically of a high grade steel box with a window of transparent material such as acrylic glass, with glove inserts. The box is equipped with an apparatus for flushing with inert gas and with gas locks. It is thus possible to manipulate materials in the desired atmosphere with the complete exclusion of air and moisture.

Stable lithium nitride in accordance with the invention is a transparent, ruby-red substance, which is easy to work. The temperature to be used for its preparation from the elements depends, obviously, on the nitrogen pressure applied, and, if at very high nitrogen pressures of the order of 12 atmospheres are used, the nitride has been formed even at low room temperature. Even with a material prepared in this manner, however, a high-temperature treatment needs to be applied in order to achieve the stated stability.

On account of its stability and its excellent ionic conductive properties combined with very low electronic conductivity, lithium nitride in accordance with the invention is suitable as a solid ionic conductor in conjunction with elemental lithium as an ion donor electrode. As previously stated, this is of special importance for the production of lithium batteries which can be miniaturized and will be characterized by stability and long life. Such batteries are therefore especially suitable for watches, cardiac pacemakers, microprocessors and the like. One electrode of such a battery will always consist of lithium itself or a lithium yielding material, and the other electrode must be capable of absorbing the lithium and cause it to react, and on the other hand of yielding electrons. Such electrodes are known to the person skilled in the art.

One special advantage of the lithium nitride of the invention is that it can be combined with the lithium electrode without a passivating intermediate layer. It is desirable to etch the surface of the lithium nitride of the invention with polar organic solvents, which must be absolutely free of oxygen and water, and then to melt molten lithium onto it. This procedure is performed in a dry box. The counterelectrode can be, for example, of the kind used in the known lithium batteries, such as chalcogenides of rare earths, titanium disulfide, molybdenum disulfide, halogens, especially iodine or fluorine in a suitable support material such as, for example, graphite felt, a mixture of lead sulfide and lead iodide, and the like. In making such batteries it is desirable to prepare the lithium electrode again under a shielding gas that is free of oxygen and water, such as high-purity argon, in a dry box or other such device. Instead of coating the electrode with molten lithium (at about 150° to 200° C.), the lithium can also be pressed on. A sintered ceramic consisting of the lithium nitride of the invention can, in suitable form, be filled directly with liquid lithium. It is also possible, of course, to operate in vacuo and apply lithium by other methods, such as vapor coating or sputtering.

Thus, a battery could be applied directly by thin-layer technology to the inside of a watchcase, for example, or to the already wired printed electronic circuit board. Lithium would be applied, by vapor coating for example, and a thin coating of $Li_3N$ would be applied to the lithium by an appropriate method. Then the positive electrode, such as, for example, titanium or molybdenum, is vacuum deposited or sputtered on, and would then be sulfidized to $TiS_2$ or $MoS_2$.

The thin layer microbattery would then be encapsulated in an insulating material leaving only the electrode lead exposed.

Another important application for the lithium nitride of the invention consists in using it in a nitrogen sensor. The ionic conductivity has proven to be dependent upon the external nitrogen pressure. Molecular nitrogen must be cleaved by an appropriate catalyst, which is advantageously applied as a surface coating on the lithium nitride. This catalyst, which can consist, for example, of noble metals, such as ruthenium and osmium, is also capable in the form of a coating of protecting the lithium nitride against corrosion. The negative electrode will again be a lithium donor, as explained above.

Another type of application consists, finally, of an ion yielding counterelectrode in an electronic color display. This is a passive, electrochemically chromatic solid-state display having a sandwich structure consisting of a transparent, conductive, thin-layer electrode, a chromatic thin film, a solid electrolyte, and a counter-electrode. The solid electrolyte consists in this case of the lithium nitride of the invention as an ionic conductor material. For example, such an electronic color display consists of doped indium oxide or doped tin oxide as the transparent conductive thin-layer electrode, tungstic oxide ($WO_3$), molybdic oxide ($MO_3$) or $V_2O_5$ as the electrochemically chromatic thin film, lithium nitride in accordance with the invention and metallic lithium or a lithium yielding material as the counter-electrode. In such an embodiment of an electronic color display, when the lithium ions from the lithium nitride layer migrate into the tungsten coating, the latter undergoes a change of color, and virtually all colors of the spectrum can be produced depending on the lithium concentration. In such a display it is important that the color changes take place with extreme rapidity. With lithium nitride in accordance with the invention, it is possible in the above example to achieve a relaxation time of the order of magnitude of the switching frequency, i.e., in the megahertz range. This is also sufficient for color television screens.

EXAMPLES

The following examples will further explain the invention.

EXAMPLE 1

Nitrogen, catalytically purified and strained through a molecular sieve having 4-Ångstrom pores, plus lithium metal of a purity of 99.9%, served as the starting material.

The lithium was placed in a tungsten beaker in an evacuable container of stainless steel. The container was then evacuated and filled with the purified nitrogen. The nitrogen pressure amounted to about 10 atmospheres. The container was then heated to about 150° C. Beginning at this temperature, the reaction between lithium and nitrogen took place completely as a result of autocatalysis (self heating).

The material was melted under 700 mmHg and solidified into a monocrystal by the Czochralski process.

Spectral analysis showed the following impurities:
Mg, Cu, Ni, $5 \times 10^{-4}$ wt-% each
Al $5 \times 10^{-3}$ wt-%
Si, Fe, $10^{-2}$ to $10^{-3}$ wt-%
Atomic absorption analysis gave the following:
Na $8 \times 10^{-3}$ wt-%
K $3 \times 10^{-3}$ wt-%
Ca $< 7 \times 10^{-3}$ wt-%

EXAMPLE 2

The procedure of Example 1 was repeated, but, after evacuation to $10^{-4}$ mmHg, the chamber was filled with nitrogen to a pressure of 500 mmHg, and then heated at a rate of about $2 \times 10^{3}$° C. per hour. When a temperature of 500° C. was reached, the total nitrogen pressure was increased to about 700 mmHg, and then held constant at this level while the heating was continued to the melting point of lithium nitride. Then the material was let cool at 4° C./h while maintaining the nitrogen pressure.

The lithium nitride thus obtained was stable in the presence of air and moisture. The purity was the same as that of the material of Example 1.

It will be understood that the specification and examples are illustrative but not limitative of the present invention and that other embodiments within the spirit and scope of the invention will suggest themselves to those skilled in the art.

What is claimed is:

1. Crystalline lithium nitride, stable in air, having the following characteristics:
sodium content of less than $5 \times 10^{-2}$ wt%
potassium content of less than $10^{-2}$ wt%
magnesium content of less than $1 \times 10^{-2}$ wt%
silicon and iron content of $10^{-2}$ to $10^{-3}$ wt%
in the form of hexagonal crystals having a layered structure containing $Li_2N$ layers with interposed lithium ions.

2. Crystalline lithium nitride as claimed in claim 1, wherein the lithium nitride has a high lithium conductivity of the order of $\delta = 10^{-3} \Omega^{-1}$ per cm-1 having an activation energy of 0.25 eV, in a direction parallel with the $Li_2N$ planes.

3. Crystalline lithium nitride as claimed in claim 1, obtained by heating of lithium of a purity of at least 99.9%, at a temperature between 300° C. and the melting point of lithium nitride, in a vessel of tungsten, niobium, ruthenium or tantalum in a nitrogen atmosphere at a pressure of at least 250 mm Hg and in the absence of oxygen and water.

4. Process for preparing lithium nitride as claimed in claim 1, which process comprises heating at least 99.9% pure lithium metal at a temperature from 140° to 180° C. in a tungsten vessel at a nitrogen pressure of at least 250 mm Hg and then raising the temperature to 400°–600° C. to the melting point of $Li_3N$.

5. Process for preparing lithium nitride as claimed in claim 1, which process comprises heating at least 99.9% pure lithium metal at a temperature from 140° to 180° C. in a tungsten vessel at a nitrogen pressure of greater than 250 mm Hg and at a temperature above 300° C.

* * * * *